United States Patent
Dubrovsky et al.

(10) Patent No.: US 12,493,529 B1
(45) Date of Patent: Dec. 9, 2025

(54) EDGE COMPUTING-ENHANCED SYSTEM FOR BUSINESS PRIORITY-BASED RESOURCE ALLOCATION

(71) Applicant: Dell Products L.P., Round Rock, TX (US)

(72) Inventors: Igor Dubrovsky, Beer Sheva (IL); Boris Shpilyuck, Ashdod (IL); Maxim Balin, Gan-Yavne (IL); Stav Sapir, Beer Sheva (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/930,093

(22) Filed: Oct. 29, 2024

(51) Int. Cl.
G06F 11/14 (2006.01)

(52) U.S. Cl.
CPC ...... G06F 11/1461 (2013.01); G06F 2201/80 (2013.01)

(58) Field of Classification Search
CPC .................. G06F 11/1461; G06F 2201/80
USPC .......................................................... 707/654
See application file for complete search history.

(56) References Cited

U.S. PATENT DOCUMENTS

| | | | |
|---|---|---|---|
| 12,056,723 B1* | 8/2024 | Bin | G06Q 30/0201 |
| 2020/0133795 A1* | 4/2020 | Rhodes | H04L 41/5096 |
| 2021/0374015 A1* | 12/2021 | Appireddygari Venkataramana | G06F 9/54 |
| 2022/0343198 A1* | 10/2022 | Chopra | G06N 5/045 |
| 2024/0302960 A1* | 9/2024 | Vibhor | G06F 3/067 |
| 2024/0320032 A1* | 9/2024 | Xu | G06F 9/542 |

* cited by examiner

*Primary Examiner* — Robert W Beausoliel, Jr.
*Assistant Examiner* — Lauren Zannah Ganger
(74) *Attorney, Agent, or Firm* — WOMBLE BOND DICKINSON (US) LLP

(57) ABSTRACT

Methods and systems for managing systems are disclosed. To manage the systems, backups of data used by the systems may be generated and stored for future use. To limit overhead for generation and storage of the backups, portions of data may be evaluated for relative importance using an automated evaluation process. The automated evaluation process may take into account entities involved in data access chains, access frequency, data location, and/or other factors. The resulting evaluations may be used to selectively deploy limited computing resources for backing up of different portions of data.

20 Claims, 5 Drawing Sheets

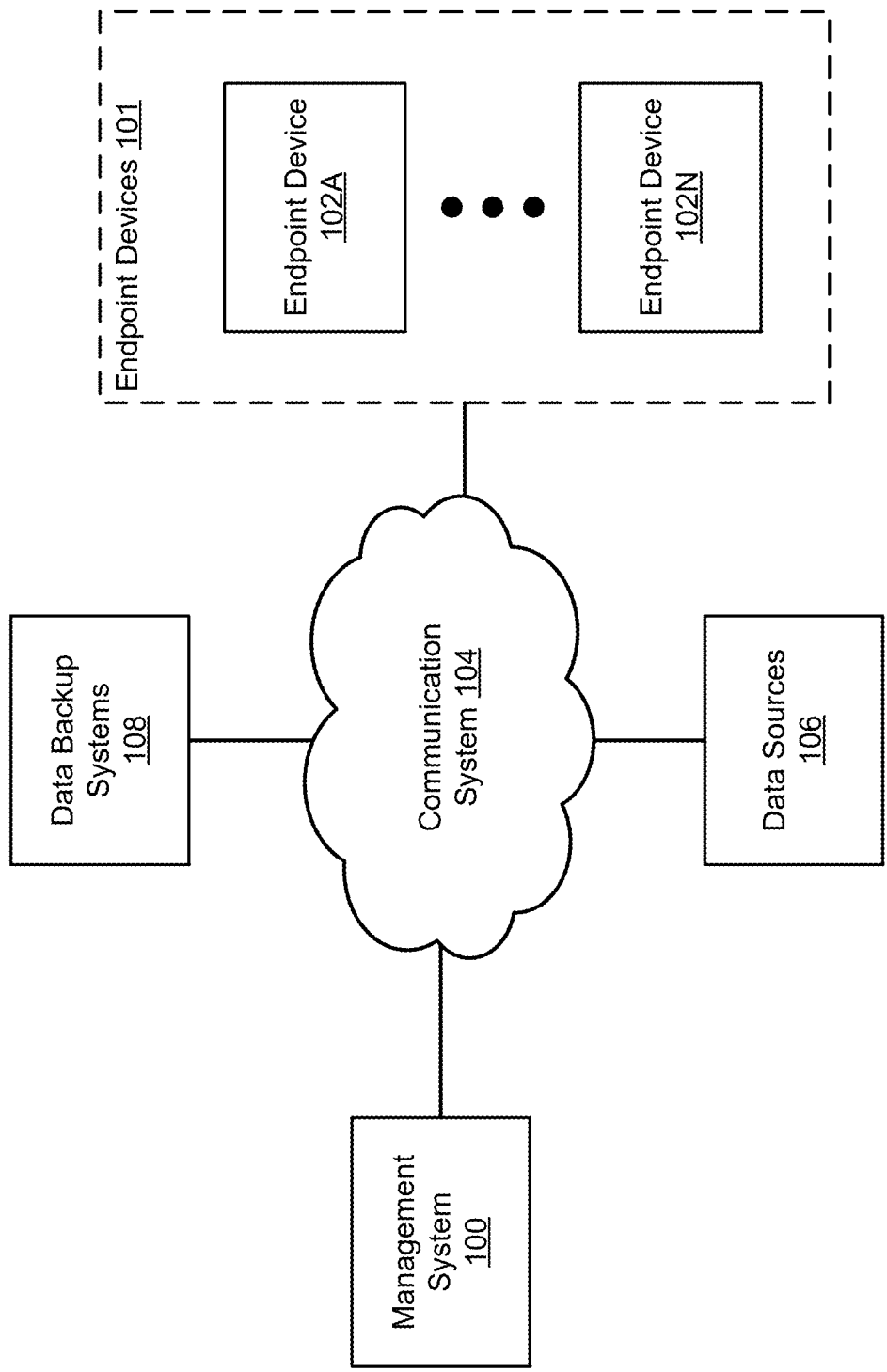

EDGE COMPUTING-ENHANCED SYSTEM FOR BUSINESS PRIORITY-BASED RESOURCE ALLOCATION

FIELD

Embodiments disclosed herein relate generally to system management. More particularly, embodiments disclosed herein relate to systems and methods to distributed systems.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIG. 1 shows a block diagram illustrating a system in accordance with an embodiment.

DETAILED DESCRIPTION

Figure 2A:
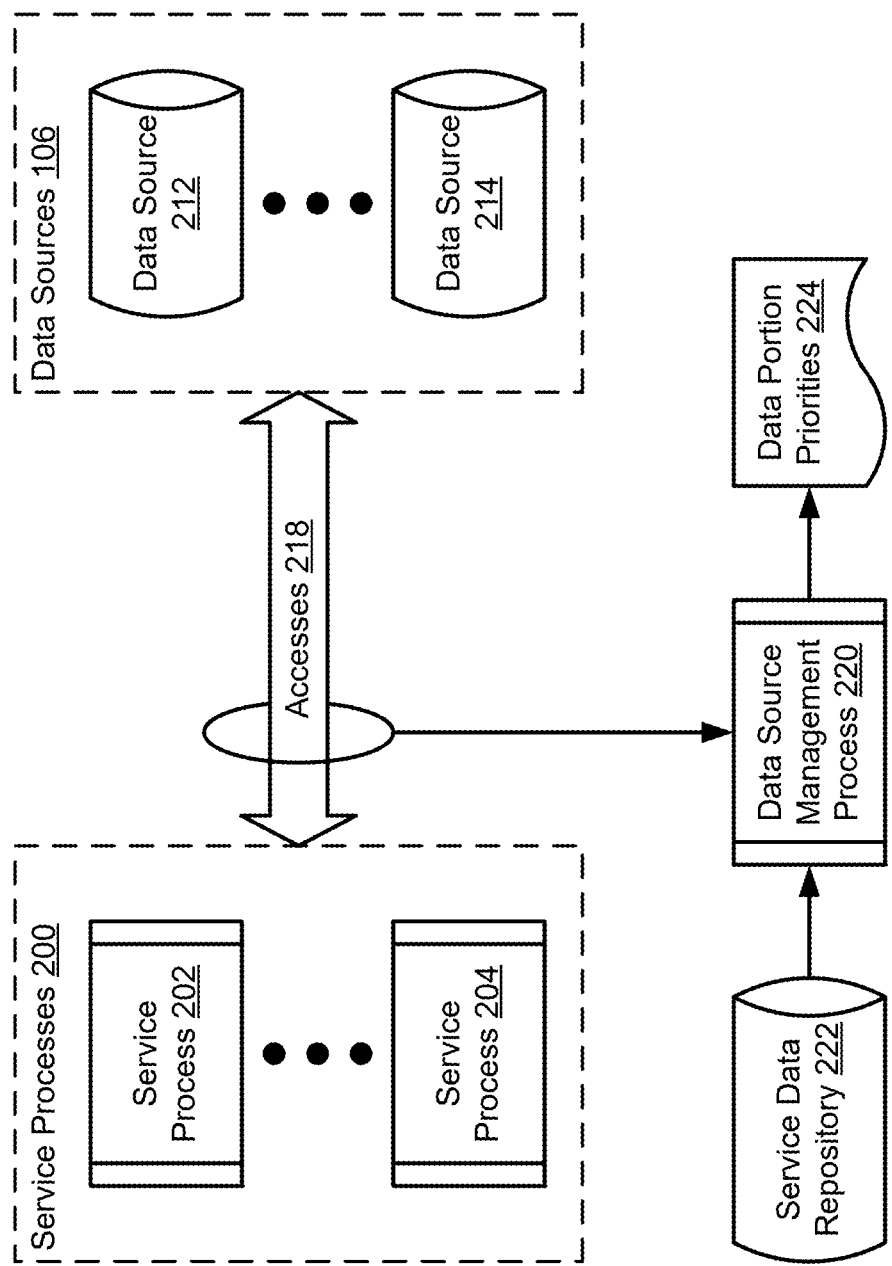
FIGS. 2A-2B show diagrams illustrating data flows in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing operation of distributed systems. The distributed systems may provide desired computer implemented services using various portions of data.

To maintain access to the data, backups of the data may be generated and stored for future use. The backups may be used to restore data after it is corrupted, loss, or becomes inaccessible for other reasons.

Generation and management of backups may be computationally expensive. To limit the expense, the resources expended for generation and management of the backups may be rationed by limiting the number/frequency of backups, types of backups, storage resources for the backups, etc.

To improve the likelihood of higher importance data being backed up, the distributed system may estimate the relative importance of different portions of data. The importance may be estimated based on access chain member, frequency of access, location, and/or other factors. More resources may be dedicated toward backing up higher importance portions of data. Consequently, backups usable to restore the higher importance portions of data may be more likely to be available over time while limiting computation expense for backing up the portions of the data.

By doing so, a system in accordance with an embodiment may be more likely to provide desired computer implemented services by having access to data necessary for performance of the computer implemented services without overloaded the system (e.g., with backup workloads). Thus, embodiments disclosed herein may address, among others, the technical problem of resource availability limits in distributed systems. The disclosed embodiments may do so by marshalling limited computing resources in a manner that is likely to result in higher importance data being backed up.

In an embodiment, a method for managing a distributed system is provided. The method may include monitoring uses of portions of data stored in data sources; obtaining priorities for the portions of data based on the uses and weights associated with entities that initiated the uses; obtaining a data backup schedule using the priorities; and managing backups for the portions of the data using the data backup schedule.

The entities may be application programming interfaces, and the uses may be accesses of the portions of the data.

The accesses of the data may be reads.

The application programming interfaces may correspond to microservices, and each of the application programming interfaces may have an associated weight of the weights.

The data backup schedule may be further obtained using backup polices that classify the portions of the data based on at least the priorities and locations of the portions of the data.

The data backup schedule may prioritize backing up the portions of the data based on classifications obtained using the backup polices.

The data backup schedule may specify when backups for the portions of the data are to be generated, and where the backups are to be stored.

Managing the backups may include identifying a storage tier for a backup of the backups and storing the backup in an instance of the storage tier.

Obtaining the data backup schedule may include classifying one of the portions of data into a group using a corresponding one of the priorities and a location of the portion of the data; identifying a backup workflow associated with the group; and adding an instance of the backup workflow to the data backup schedule for the portion of the data.

The weights may be based on identities of the entities that performed the uses of the portions of the data, and the priorities may indicate a relative level of business value for each of the portions of the data.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services. The computer-implemented services may include data management services, data storage services, data access and control services, database services, and/or any other types of services that may be providing with a computing device.

To provide the computer implemented services, the components of the system may generate, read, store, and use data over time. If the system is unable to use previously stored data at future points in time, then the system may be unable to provide desired computer implemented services.

In general, embodiments disclosed herein may provide methods, systems, and/or devices for improving the likelihood of being able to provide computer implemented services over time. To improve the likelihood, backups of data used by the system to provide the computer implemented services may be generated and stored.

In the event that access to data is lost (e.g., due to data corruption, hardware failures, etc.), the backups may be used to restore access to the data. The backups may be any type of backup such as point in time backups (e.g., based on the state of data at a point in time), differential backups (e.g., changes in the state of data over time), etc. The backups may be used in isolation and/or combination to restore access to data that existed at various points in time.

To generate the backups, information regarding portions of data to be backed up may be added to a backup file. Once generated, the backup file may be stored in backup storage for future use. The backup storage may be distinguishable from primary storage in which the data is stored (e.g., an used, such as in production systems).

Generating and storing backups of data may be computationally expensive. Consequently, generating and storing backups may limit the ability of a system to provide desired computer implemented services. To balance the advantages of having access to backups versus the computational cost of generating the backups, the system may limit the numbers of backups, types of backups, and resources used to maintain backups. For example, rather than generating a backup everyday, a backup of a file may be generated once a week to reduce computational resource usage. However, the reduced number of available backups may limit to which states the data may be restored using the backups.

To decide how to allocate resources for backup generation, the system may ascribe a level of business value to each portion of data. Portions of data ascribed higher levels of business value may be allocated more resources for backup generation and maintenance. In contrast, other portions of data that are ascribed lower levels of business value may be allocated fewer resources for backup generation and maintenance.

To identify the level of business value to each portion of data, information regarding the use of the data may be tracked over time. The number of uses and users of the data may be used as a basis for ascribing business value. Consequently, the business value may be assessed in an automated manner, and downstream policy decisions based on the level of business value may be automatically made with little to no user intervention.

Additionally, the manner in which business value is assessed may take into account time changes uses of the system. For example, as uses of the system change over time, the business value ascribed to each portion of data may be updated over time based on changing numbers of uses and entities that used the portions of the data.

Thus, embodiments disclosed herein may improve the likelihood that data necessary to provide desired computer implemented services is available over time. The disclosed method may do so by ascribing relative importance (e.g., prioritize, business value, etc.) to different portions of data in a standardized manner that automatically adapts to changing use of systems. Accordingly, the resulting backup workflows performed over time based on the priorities for the portions of data may also dynamically change over time.

To provide the above noted functionality, the system of FIG. 1 may include management system 100, endpoint devices 101, communication system 104, data sources 106, and data backup systems 108. Each of these components is discussed below.

Endpoints devices 101 may (i) provide computer implemented services using data, (ii) generate, store, and read data used in the computer implemented services, (iii) generate and store backups of the data in data backup systems 108 based on data backup schedules, and/or (iv) provide information regarding uses of data to management system 100 to facilitate creation of data backups schedules. When doing so, endpoint devices 101 may utilize data from and store data with data sources 106.

Management system 100 may manage the operation of endpoint devices 101 by, for example, updating the operation of any of endpoint devices 101, obtaining information regarding uses of data, and generate and deploy data backup schedules to endpoint devices 101 and/or data backup systems 108 to manage generation and storage of backups. For example, management system 100 may serve as an orchestrator to coordinate activity of endpoint devices 101, data sources 106, and data backup systems 108.

Data sources 106 may store data and provide data to endpoint devices 101. While illustrated as being separate from endpoint devices 101, it will be appreciated that data sources 106 may be part of endpoint device 101.

Data backup systems 108 may store, manage, and provide copies of backups of data. Data backup systems 108 may be a tiered system, that provides different levels of service to different backups. Backups of data may be stored in corresponding tiers based on their relative level of importance, and may be migrated between tiers over time. Different tiers of storage may be limited. Consequently, the resources of data backup system 108 may be rationed based on the relative level of importance of the backups by the data backup schedules established by management system.

Figure 2B:
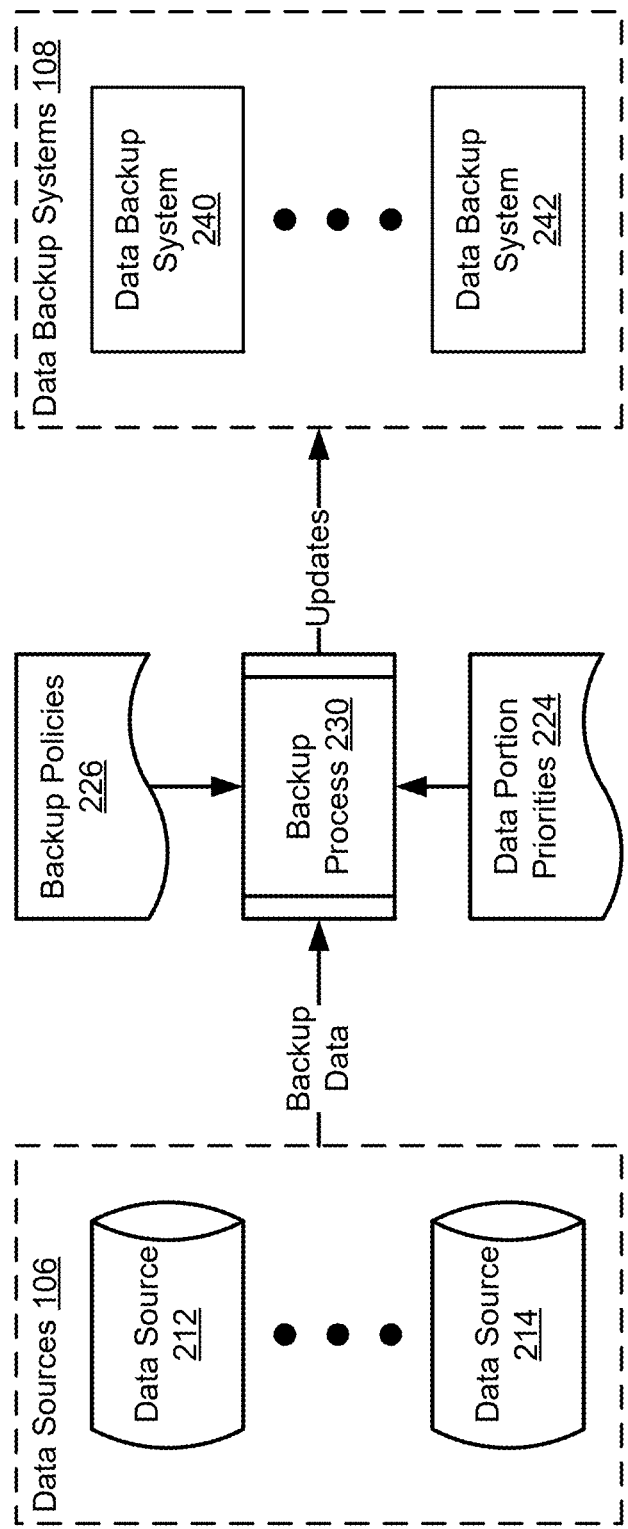
Figure 3:
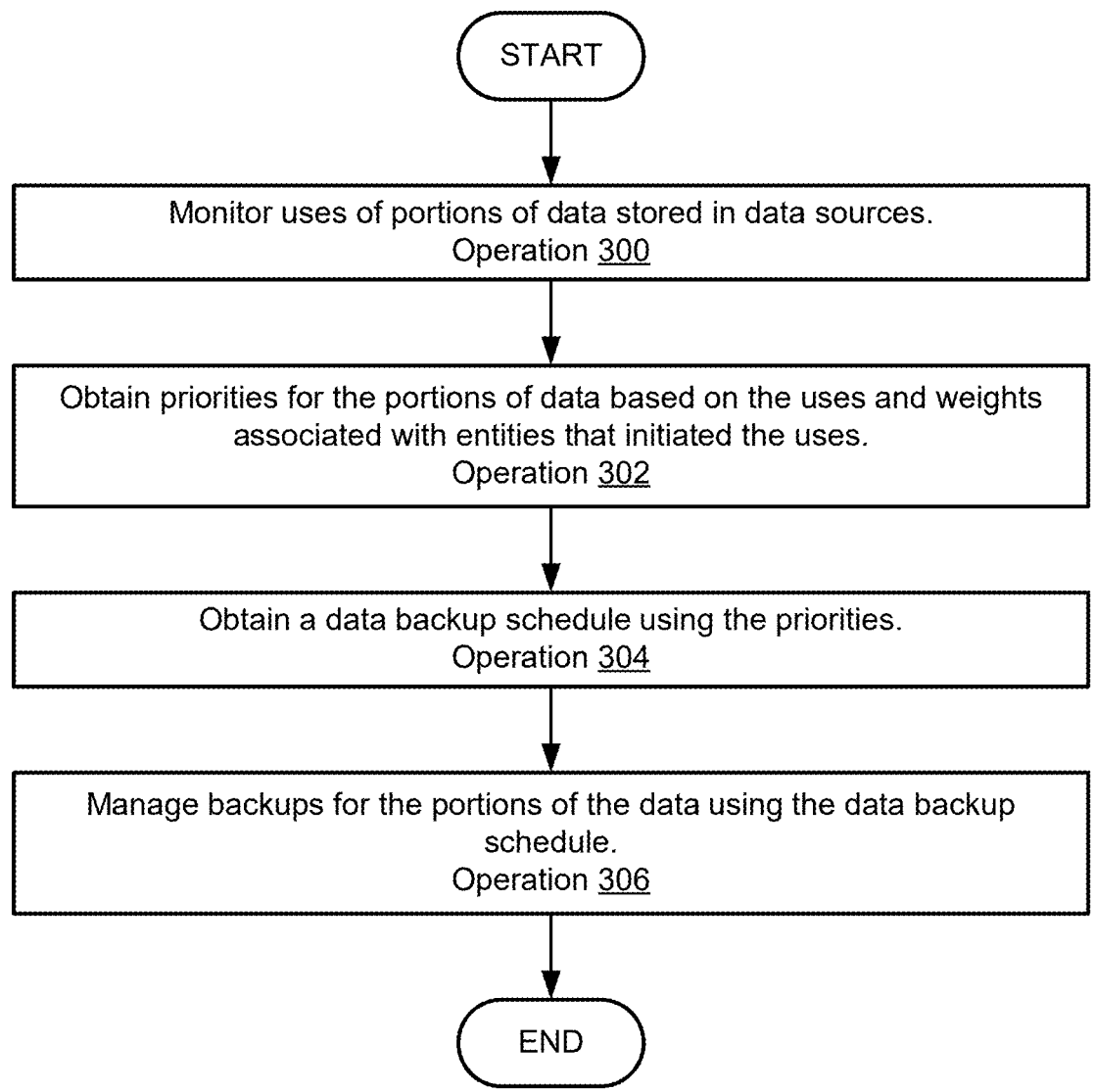
FIG. 3 shows a flow diagram illustrating a method of providing computer implemented services in accordance with an embodiment.

When providing their functionality, any of management system 100, endpoint device 101, data sources 106, and/or data backup systems 108 (and/or portions thereof) may perform all, or a portion, of the actions, flows, and methods shown in FIGS. 2A-3.

Any of (and/or components thereof) management system 100, endpoint device 101, data sources 106, and data backup systems 108 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 104. In an embodiment, communication system 104 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

To further clarify embodiments disclosed herein, data flow diagrams in accordance with an embodiment are shown in FIGS. 2A-2B. In these diagrams, flows of data and processing of data are illustrated using different sets of shapes. A first set of shapes (e.g., 224, 226, etc.) is used to represent data structures, a second set of shapes (e.g., 220, 230, etc.) is used to represent processes performed using and/or that generate data, and a third set of shapes (e.g., 212, 214, etc.) is used to represent large scale data structures such as databases.

Turning to FIG. 2A, a first data flow diagram in accordance with an embodiment is shown. The first data flow diagram may illustrate data used in and data processing performed in establishing priorities for different portions of data.

To establish priorities of different portions of data, data source management process 220 may be performed. During data source management process 220, information regarding uses of portions of data stored in data sources 212-214 may be collected.

To collect the information, accesses 218 of the portion of the data by various service processes (e.g., 200) hosted by endpoint devices may be monitored. For example, each of the service processes (e.g., 202, 204) may be a microservice that corresponds to an application programming interface of an application hosted by one of the endpoint devices. During operation, the application programming interfaces may receive requests from other entities, and act on the requests. The actions may include, for example, accessing portions of data and sending requests to other application programming interfaces that may, in turn, access portions of data. The aforementioned interaction may be referred to as an access chain.

To obtain the information, each of the endpoint devices may host a reporting framework (e.g., one or more applications) that track access of different portions of information, and/or the corresponding access chains. The information collected by the reportion frameworks may be ingested by data source management process 220.

Once ingested, data source management process 220 may establish data portion priorities 224. Data portion priorities 224 may be weights or other metrics (e.g., quantifications) regarding the relative level of importance (or absolute level of importance) of each portion of data that may be backed up. As will be discussed with respect to FIG. 2B, these data portion priorities 224 may be used to select and implement data backup schedules used to guide backup generation and management.

To generate data portion priorities 224, data source management process 220 may use the ingested information from the endpoint devices. For example for a portion of data, each access of the portion of the data by one of services processes 200 may be ascribed a value, and the values may be averaged or otherwise combined to ascribe a single quantification as a priority for the portion of the data. The value ascribed to each access may be based on an entity that participated in the access (e.g., each entity may be ascribed a value based on a relative level of importance, thus access of a portion of data by different entities may be ascribed different values).

In a first example, the entity may be a last entity in an access chain (e.g., the entity that sent the read/write/delete request). For example, if a first service ascribed a value of 1 issues a request to a second service (e.g., via application programming interfaces) ascribed a value of 0.5 which in turn issues a read request for a portion of data, the access may be given a value of 0.5 because the second service issued the actual access request.

In a second example, the entity may be an entity in the access chain that is ascribed a highest level of importance (e.g., an correspondingly, highest value). For example, if a first service ascribed a value of 1 issues a request to a second service (e.g., via application programming interfaces) ascribed a value of 0.5 which in turn issues a read request for a portion of data, the access may be given a value of 1 because the first service is the highest valued entity in the access chain and is ascribed a value of 1.

In a third example, the entity may be a fictitious entity that is ascribed a value of an average of the values ascribed to the entities in the access chain. For example, if a first service ascribed a value of 1 issues a request to a second service (e.g., via application programming interfaces) ascribed a value of 0.5 which in turn issues a read request for a portion of data, the access may be given a value of 0.75 because the average (e.g., (1+0.5)/2=0.75) of the values ascribed to the two services in the access chain is 0.75.

It will be appreciated that different sets of rules may be used to ascribe values to accesses based on the entities participating in the access chains without departing from embodiments disclosed herein.

Once the values for each of the accesses of a portion of data are obtained, the values themselves may be averaged or otherwise used (e.g., could be a highest value, lowest value, median value, etc.) to ascribe a priority to the portion of data, which may be added to data portion priorities 224. The aforementioned process may be repeated for each portion of data.

It will be appreciated that a portion of data may be any ascertainable amount of data such as, for example, a file, a volume used in a file system, an image, etc.

To ascribe values to different entities, information may be read from service data repository 222. Service data repository 222 may include values or other information for each entity which may be part of an access chain. The values may be obtained, for example, during development of software corresponding to the service processes, may be evaluated dynamically (e.g., in a complete automated or semi-automated manner, which may include subject matter expert involvement), etc.

Once obtained, data portion priorities 224 may be used to guide backup generation, as further discussed with respect to FIG. 2B.

Turning to FIG. 2B, a second data flow diagram in accordance with an embodiment is shown. The first data flow diagram may illustrate data used in and data processing performed in managing backups for portions of data.

To manage backups for portions of data, backup process 230 may be performed. During backup process 230, data backup schedules for portion of data may be created and/or updated. The data backup schedules may then be used to (i) initiate generation and storage of backups in data backup systems 108, (ii) migrate backups between tiers of data backup systems 108 over time, (iii) delete previously generated backups to free up storage space, and/or perform other processes to generate and manage backups of portions of data.

Backup process 230 may be a distributed process. For example, management system 100 may generate the data backup schedules, and endpoint devices may generate the backups based on the data backup schedules. However, it will be appreciated that any of the components shown in FIG. 1 may perform any portions of backup process 230.

To obtain data backup schedules, data portion priorities 224 and backup policies 226 may be ingested. To generate a data backup schedule for a portion of data, the corresponding priority from data portion priorities 224 may be read. The corresponding priority may then be used as a key to identify one of backup policies 226 (e.g., different backup policies may be keyed to different priorities, priority ranges, etc.).

For example, backup policies 226 may specify backup workflows for different priorities. A backup workflow may specify (i) when backups are to be generated, (ii) resources to be allocated for storing the backups (e.g., tiers with different performance levels), (iii) when backups are to be migrated between tiers, (iv) when backups are to be deleted, and/or other information usable to generate and manage backups. Thus, different backup workflows may have different resources requirements (e.g., more frequently generated backups may require more resources from endpoint devices to be used, backups stored in higher tiers of data backup systems 108 may consume more storage space, etc.).

Once a backup workflow for a portion of data is identified, the backup workflow may be added to a data backup schedule. The data backup schedule may then be performed resulting, for example, in backup data for the portions of the data being obtained and used to generate backups stored in data backup systems 108, in updates to storage of the backups (e.g., migration between tiers, deletion when retention time limits are exceeded), etc.

Thus, over time, backups may be moved between different data backup systems (e.g., 240-242), may be deleted, new backups may be generated, etc.

Thus, using the flows shown in FIGS. 2A-2B, embodiments disclosed herein may improve the likelihood of computer implemented services being provided by preferentially dedicating resources for management of portions of data that are of higher importance to the desired computer implemented services.

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the data structures illustrated using the first and third set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIG. 1 may perform various methods to manage data used in computer implemented services. FIG. 3 illustrates a method that may be performed by the components of FIG. 1. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method of managing a distributed system in accordance with an embodiment is shown. The method may be performed by any of the components of the system of FIG. 1.

At operation 300, uses of portions of data stored in data sources may be monitored. The uses may be monitored by monitoring activity of application programming interfaces corresponding to services (e.g., microservices). The monitoring may indicate when (i) requests for data are sent between application programming interfaces, (ii) when access (e.g., read/write/delete/etc.) of the data are initiated by the application programming interfaces, (iii) identifies of the entities involved in the requests/accesses, etc. The monitoring may be used to identify access chains, entities that are part of the chains, and the portions of data which were accessed via the access chains.

At operation 302, priorities for the portions of data based on the uses and weights associated with the entities that initiated the uses. The weights may be read from storage, received from another entity, may be generated based on analysis or assessment by subject matter experts, and/or obtained via other methods. The weights may correspond to different entities.

For each portion of data, the priority may be identified using corresponding access chain for access of the portion of the data and the corresponding weight of the entities from the access chain that is deemed to have initiated the access. As with respect to FIG. 2A, the entity deemed to have initiated the access may be (i) the entity that made the access of the portion of the data (e.g., the last entity in the access chain), (ii) the first entity in the access chain, (iii) a highest weighted entity in the access chain, and/or (iv) a synthetic construct that is ascribed the average weight of the entities in the access chain. The resulting weight for each access of the portion of the data may then be average or otherwise used (e.g., max, min, median, etc.) to obtain a quantification to be used as a priority for the portion of the data. It will be appreciated that the quantification may be normalized to a particular scale.

At operation 304, a backup schedule using the priorities is obtained. The backup schedule may be obtained by using the priority for each portion of data to identify a corresponding backup policy. The corresponding backup policy may specify a backup workflow for the portion of the data.

In addition to the priority, a location of each portion of the data may also be used to identify a corresponding backup policy. For example, the priority and location may be used to establish a quantification usable to group the portion of the data with into a backup policy (e.g., different backup policies may be associated with different quantification ranges). For example, consider a scenario where there are three backup policies associated with quantification ranges of 0-0.3, >0.3-0.7, and >0.7. If a portion of data has a priority of 0.25, and a location (different locations may also have values depending on the locations, locations that are more likely to lose data such as edge deployments may be given higher weights) a value of 0.1, the resulting value of 0.35 (e.g., 0.25+0.1) for the portion of the data may be grouped with the second backup policy having the range of >0.3-0.7. Accordingly, the workflow for that backup policy may be selected.

Using the above approach, backup workflow instances for each of the portions of the data (based on the matched backup policies) may be added to the data backup schedule.

At operation 306, backups for the portions of the data are managed using the data backup schedule. The backups may be managed by (i) initiating generation and storage of backups based on the data backup schedule, (ii) migrating existing backups between tiers based on the data backup schedule, (iii) deletion of existing backups based on retention limits of the data backup schedule, and/or other actions may be performed based on the data backup schedule.

Additionally, when access to data is lost, the backups may be used to restore access to the portions of the data. For example, when a portion of data is corrupted due to hardware error, one or more of the backups may be used to restore the portion of the data to a previous state that is usable. Thus, the backups may be used to restore access to the date.

The restored data may then be used in desired computer implemented services provided by the endpoint devices.

Figure 4:
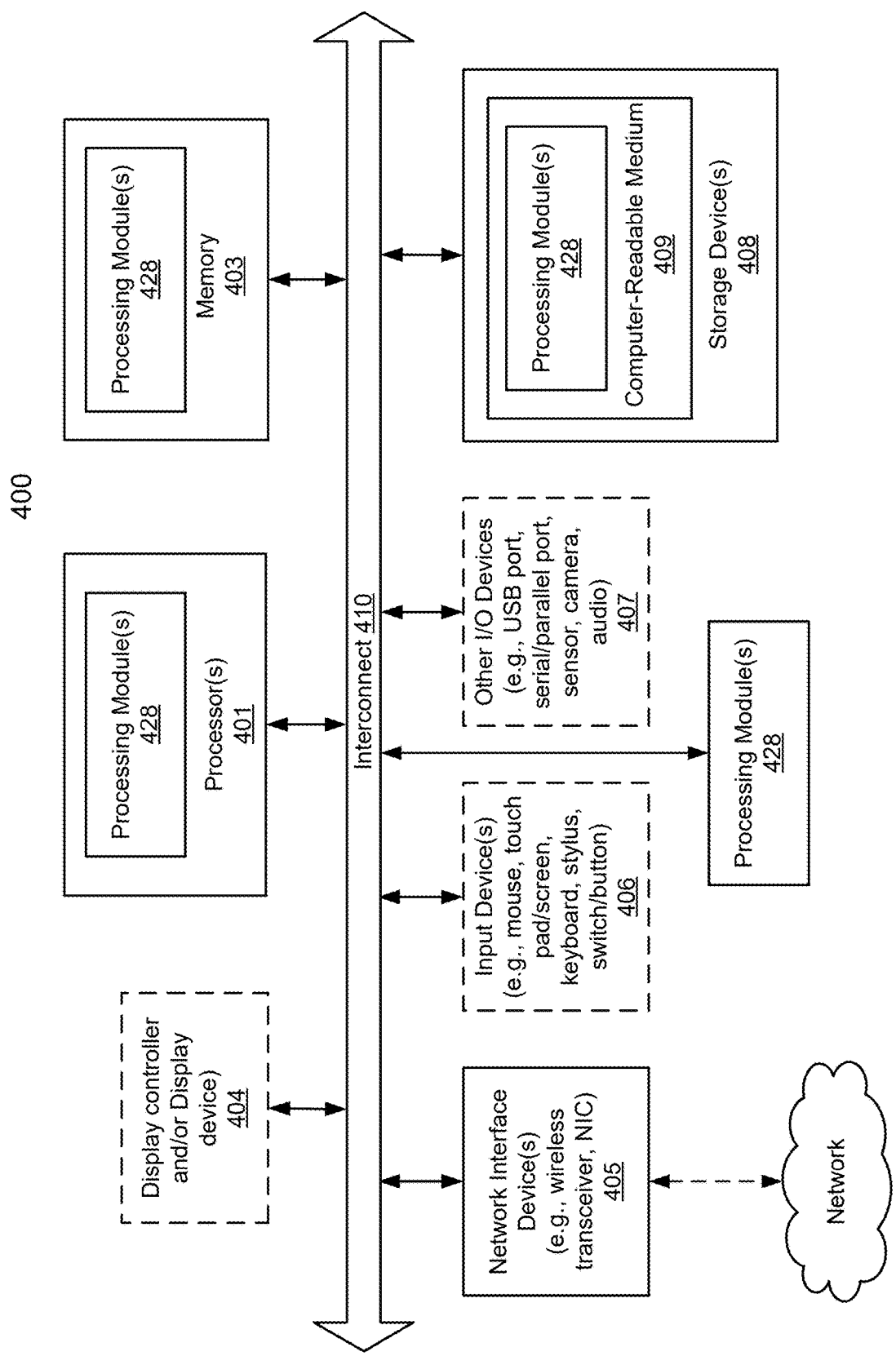
FIG. 4 shows a block diagram illustrating a data processing system in accordance with an embodiment.

Any of the components illustrated in FIGS. 1-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing a distributed system, the method comprising:
monitoring uses of portions of data stored in data sources, the uses being based on access chains for the portions of data, and each of the access chains comprising a set of entities that facilitated a single access of one of the portions of the data;
obtaining priorities for the portions of data based on:
the uses and weights associated with entities that initiated the uses, and
weights of other entities that facilitated the uses, the set of entities being a part of the other entities;
obtaining a data backup schedule using the priorities; and
managing backups for the portions of the data using the data backup schedule.

2. The method of claim 1, wherein the entities are application programming interfaces, and the uses are accesses of the portions of the data.

3. The method of claim 2, wherein the accesses of the data are reads.

4. The method of claim 2, wherein the application programming interfaces correspond to microservices, and each of the application programming interfaces has an associated weight of the weights.

5. The method of claim 1, wherein the data backup schedule is further obtained using backup polices that classify the portions of the data based on at least the priorities and locations of the portions of the data.

6. The method of claim 1, wherein the weights are based on identities of the entities that performed the uses of the portions of the data, and the priorities indicate a relative level of business value for each of the portions of the data.

7. The method of claim 1, wherein, during the obtaining of the priorities, each of the uses is ascribed a value based on a last entity in a correspond one of the access chains.

8. The method of claim 7, wherein each of the entities is ascribed a corresponding value during a development process for each of the entities.

9. The method of claim 1, wherein, during the obtaining of the priorities, each of the uses is ascribed a value by averaging values ascribed to each of the entities that participated in a corresponding one of the access chains.

10. The method of claim 1, wherein, during the obtaining of the priorities, each of the uses is ascribed a value ascribed to one of the entities that participated in a corresponding one of the access chains that is ascribed a highest value.

11. A non-transitory machine-readable medium having instructions stored therein, which when executed by a processor, cause operations for managing a distributed system to be performed, the operations comprising:
monitoring uses of portions of data stored in data sources, the uses being based on access chains for the portions of data, and each of the access chains comprising a set of entities that facilitated a single access of one of the portions of the data;
obtaining priorities for the portions of data based on:
the uses and weights associated with entities that initiated the uses, and
weights of other entities that facilitated the uses, the set of entities being a part of the other entities;
obtaining a data backup schedule using the priorities; and
managing backups for the portions of the data using the data backup schedule.

12. The non-transitory machine-readable medium of claim 11, wherein the entities are application programming interfaces, and the uses are accesses of the portions of the data.

13. The non-transitory machine-readable medium of claim 12, wherein the accesses of the data are reads.

14. The non-transitory machine-readable medium of claim 12, wherein the application programming interfaces correspond to microservices, and each of the application programming interfaces has an associated weight of the weights.

15. The non-transitory machine-readable medium of claim 11, wherein the data backup schedule is further obtained using backup polices that classify the portions of the data based on at least the priorities and locations of the portions of the data.

16. A data processing system, comprising:
a processor; and
a memory coupled to the processor to store instructions, which when executed by the processor, cause operations for managing a distributed system, the operations comprising:
monitoring uses of portions of data stored in data sources, the uses being based on access chains for the portions of data, and each of the access chains comprising a set of entities that facilitated a single access of one of the portions of the data;
obtaining priorities for the portions of data based on:
the uses and weights associated with entities that initiated the uses, and
weights of other entities that facilitated the uses, the set of entities being a part of the other entities;
obtaining a data backup schedule using the priorities; and
managing backups for the portions of the data using the data backup schedule.

17. The data processing system of claim 16, wherein the entities are application programming interfaces, and the uses are accesses of the portions of the data.

18. The data processing system of claim 17 wherein the accesses of the data are reads.

19. The data processing system of claim 17, wherein the application programming interfaces correspond to microservices, and each of the application programming interfaces has an associated weight of the weights.

20. The data processing system of claim 16, wherein the data backup schedule is further obtained using backup polices that classify the portions of the data based on at least the priorities and locations of the portions of the data.

* * * * *